United States Patent
Baggs

(10) Patent No.: US 7,883,774 B1
(45) Date of Patent: Feb. 8, 2011

(54) PAINTBALL FORMULATION AND METHOD FOR MAKING THE SAME

(75) Inventor: Yancy Baggs, Neosho, MO (US)

(73) Assignee: JT Sports LLC, Bentonville, AR (US)

( * ) Notice: Subject to any disclaimer, the term of this patent is extended or adjusted under 35 U.S.C. 154(b) by 980 days.

(21) Appl. No.: 11/726,477

(22) Filed: Mar. 22, 2007

Related U.S. Application Data

(63) Continuation-in-part of application No. 11/501,467, filed on Aug. 9, 2006, now Pat. No. 7,776,443.

(60) Provisional application No. 60/784,651, filed on Mar. 22, 2006, provisional application No. 60/707,295, filed on Aug. 10, 2005.

(51) Int. Cl.
*B32B 5/00* (2006.01)
*C09B 69/00* (2006.01)

(52) U.S. Cl. .................... 428/402.2; 8/580; 8/526

(58) Field of Classification Search ............. 428/402.2; 8/580, 526

See application file for complete search history.

(56) References Cited

U.S. PATENT DOCUMENTS

| | | | |
|---|---|---|---|
| 4,656,092 A | 4/1987 | Haman et al. | 428/402 |
| 6,530,962 B1 | 3/2003 | Stolz | 8/576 |
| 7,134,978 B2 | 11/2006 | Liu et al. | 473/577 |

*Primary Examiner*—Thao T. Tran
(74) *Attorney, Agent, or Firm*—Keisling & Pieper; Meredith K. Lowry

(57) ABSTRACT

The invention herein provides for an improved fill composition for encapsulation in casing structures adapted for projectile motion and rupture upon contact with a target surface, such as paintballs. The fill composition adapted for use in an impact-rupturable capsule of the invention comprises a water soluble dye and soy oil. The invention further provides for an improved shell composition for an impact-rupturable capsule containing the fill composition.

20 Claims, 3 Drawing Sheets

PAINTBALL FORMULATION AND METHOD FOR MAKING THE SAME

CROSS-REFERENCE TO RELATED APPLICATIONS

This application claims priority to and is a continuation-in-part of U.S. provisional application Ser. No. 60/784,651 filed on Mar. 22, 2006, entitled SOY WAX PAINTBALL and claims priority to and is a continuation-in-part of U.S. patent application Ser. No. 11/501,467 filed on Aug. 9, 2006, now U.S. Pat. No. 7,776,443 entitled SOYOIL PAINTBALL, which claims priority to and is a continuation-in-part of U.S. provisional application Ser. No. 60/707,295 filed on Aug. 10, 2005, entitled SOYOIL PAINTBALL.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

FIELD OF THE INVENTION

The invention relates to dye formulations for containment in impact-rupturable projectile capsules and for dispersing on impact with a surface. In particular, the invention pertains to dye compositions used in paintballs and in conjunction with paintball firing devices in the sports and leisure fields, for example. Known art may be found in U.S. Class 8, subclasses 576 and others.

BACKGROUND OF THE INVENTION

Soft and hard capsules or casings have been employed in the pharmaceutical field to encapsulate a variety of therapeutic and nutritional liquid compositions. Similar technology has been employed in the sports and leisure fields to contain dye formulations within capsules adapted to rupture upon impact with an intended target. Liquid dye compositions encapsulated within gelatin casings, collectively and commonly known as "paintballs," are designed for use in conjunction with a projectile device, such as a "paintball gun". Generally, such dye capsules have the physical properties in which the casing is hard and impact resistant enough to survive high velocity projectile forces, while at the same time adapted to rupture and release the dye composition upon high velocity contact with the target surface. "Paintball" is now a recognized and popular sporting activity, played by thousands of men and women throughout this country, as well as thirty other countries worldwide.

When employed in competitive activities wherein the objective of said activity is to identify the accuracy of marking the intended target, it is desirable to optimize the visual results of a successful contact with the intended target. Dye compositions used in paintballs are available in a wide variety of bright colors. The particular color can be used, for example, to identify the source of the paintball after firing. In addition to a clearly visible coloration applied to the surface of the target, the effects can also be enhanced by the dispersing or "splatter" capabilities of the dye composition upon rupturing of the casing. These visual objectives must, however, be balanced in conjunction with certain physical parameters, such as cleaning from fabrics, overall weight and the ability for the liquid dye composition to be contained for a prolonged period of time within the casing material without substantive degradation. Furthermore, regulatory concerns must be addressed as well, such as toxicity of ingredients.

Some currently available dye compositions used in paintballs contain a dye in conjunction with hydrophilic carriers containing a mixture of high and low molecular weight polyethylene glycols (PEG). Among the disadvantages associated with currently available dye compositions include tenacious or permanent staining of target fabrics, freezing and solidification of the dye composition during exposure to colder temperatures, and separation and precipitation of dye composition ingredients during storage, and a thin consistency.

At least one attempt at a chemically altered paintball has been made. U.S. Pat. No. 4,656,092 issued to Haman et al. on Apr. 7, 1987 entitled Target shooting capsules paintball discusses a target shooting capsule comprising a substantially spherical, nontoxic, soft elastic gelatin capsule having a dry wall thickness of about 0.004 inches to about 0.013 inches, having a diameter of about 0.16 inches to about 0.265 inches, and containing about 0.03 cc to about 0.12 cc of a water washable, nontoxic fill material. The fill material utilizes a silica thickener, which affects the ability of the fill material to adhere to a surface, thus producing a fill material unacceptable to most paintball players.

U.S. Pat. No. 6,530,962 to Stoltz shows a dye composition having an emulsifier and a lipophilic carrier for a paintball. The emulsifier necessarily includes ethoxylated mono- and diglycerides that thicken and concentrate the splatter from a ruptured paintball as shown in the Figures of that patent. While such may be acceptable to accomplish the object of that patent, such deviations from traditional paintball performance are not readily accepted by established players and hence undesirable.

U.S. Pat. No. 7,134,978 issued to Liu et al. on Nov. 14, 2006 entitled Seamless BB paintball discusses a paintball utilizing the principle of repulsion between oil and water, the differences of surface tension of oil and water, and the character of melting of gelatin materials in high temperature and solidification in cold temperature to produce a biodegradable seamless BB paintball for BB guns. It contains a colored edible oil solution and is safe when it hits the target to produce an obvious mark that is edible. The seamless paintballs so produced are consistent in size and weight. It reduces the possibility of jamming during shooting and loading of BB guns which are common complaints of the conventional BB paintballs. A specially designed double nozzled machine can produce oil-in-water perfectly round and seamless droplets. The oil solution contains the dyes and the water solution contains a specially formulated gelatin. The droplets are then solidified by a chilled cooling oil flow. The oil solution comprises of 1% 5% (W/W) edible dye in edible oil. The water solution comprises of 10% 34% gelatin that can also consist of 1% 10% polyethylene glycol (PEG), 1% 10% starch and 0.1% 1% edible dye in distilled water. As noted by Stoltz, the use of PEG as a carrier allows the fill material to run after impact upon a surface, staining more of the surface than desired. This characteristic of the Haman fill material produces a paintball unacceptable to most paintball players.

Each of these patents is hereby expressly incorporated by reference in their entirety.

There exists a need in the field of sports and leisure, as well as the zoological field, for improved technology relating to impact-rupturable capsules containing dye formulations that enhance the paintball while maintaining characteristic performance attributes. In particular, there is a need to improve the desirable attributes of impact-rupturable dye capsules by enhancing the properties of the dye formulations within while simultaneously maintaining the expected performance characteristics of the capsule.

SUMMARY OF THE INVENTION

The invention provides for an improved liquid dye composition for encapsulation in casing structures adapted for intact projectile motion and rupture upon contact with a target surface. In particular, the dye composition of the invention is useful in paintballs for use in conjunction with projectile devices, such as paintball guns that maintain the expected performance characteristics of the paintballs. The dye composition of the invention is also useful in the zoological and wildlife preservation fields, such as "tagging" animals without substantive injury or the need for sedation in order to aid in tracking their movements through the environment.

It has been discovered that the use of certain types of surfactants in conjunction with certain other specific types of ingredients produce a liquid dye composition having a unique combination of desirable properties associated with the impact-rupturable capsules. More particularly, it has been discovered that dye formulations can be prepared which have the advantages of: i) improved consistency and reduced separation of ingredients; ii) comparable viscosity and thickness; iii) comparable "smearability" and splattering of dye on the target surface upon impact and rupture of the casing; iv) greater water solubility and improved machine washability; and v) greater ability to regulate weight of the capsule (up to 3.5 g limit).

The invention provides for an impact-rupturable capsule comprising:

A casing adapted to contain a liquid dye composition, to remain intact upon exertion of projectile forces sufficient to propel said casing, and to rupture upon impact with a solid or semi-solid surface and release said liquid composition; and An object of the present invention is to provide an improved formulation composition for a rupturable dye capsule.

Another object of the present invention is to provide a paintball with an improved dye composition that maintains the expected performance characteristics of previous paintballs.

A basic object of the present invention is to provide an improved paintball.

Yet another object of the present invention is to provide an improved dye formulation that may be easily substituted for other formulations in existing paintball capsules.

An object of the present invention is to provide economical paintballs to enhance the sport.

A related object is to provide a dye composition that may be easily used with paintballs.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
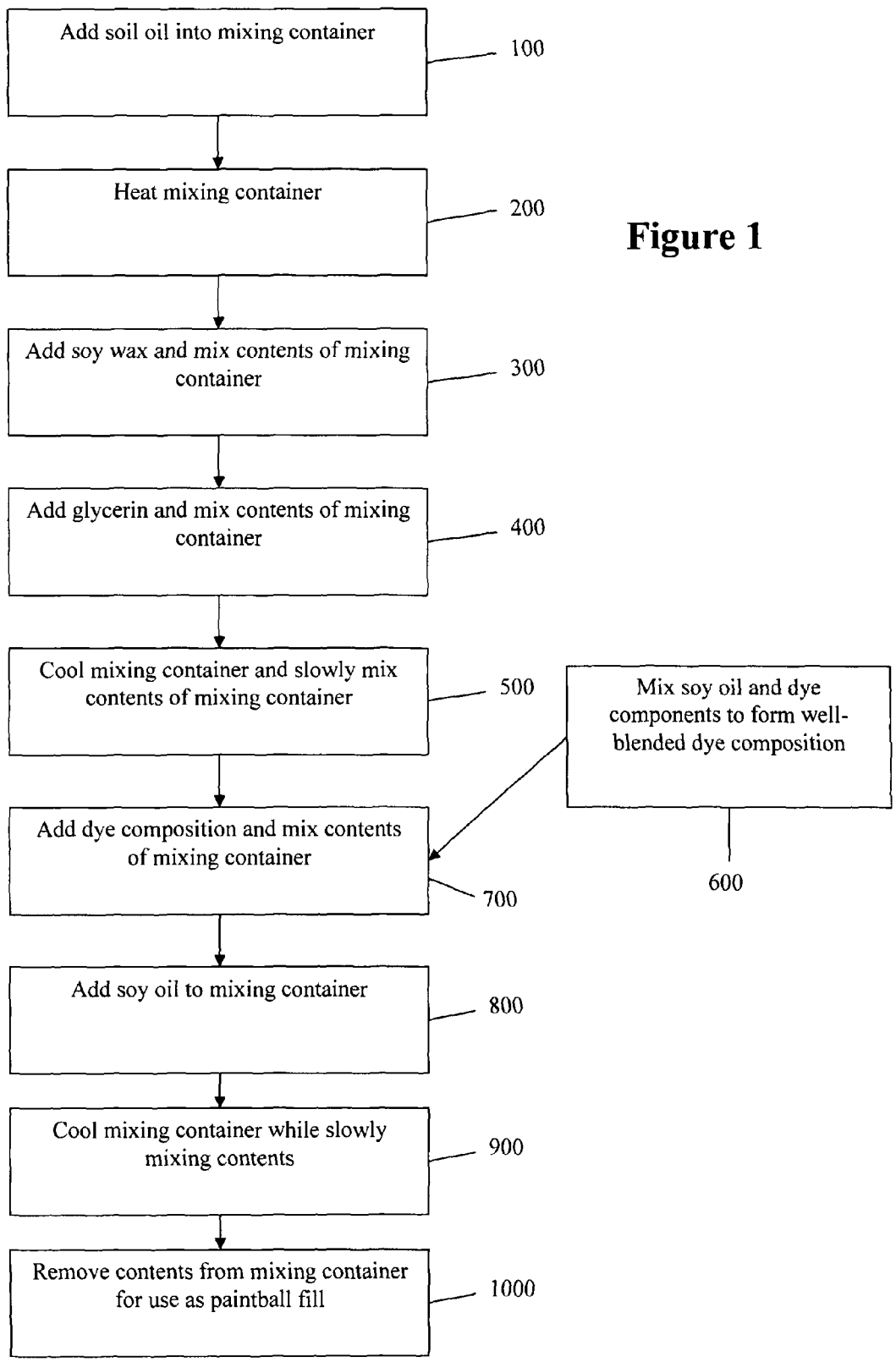
FIG. 1 is a flow chart illustrating a method of manufacture of the fill of the improved paintball.

As used herein, the phrase "impact-rupturable capsule" is meant to describe a capsule containing a liquid or semi-solid component therein, said capsule adapted to rupture upon impact with a solid or semi-solid surface.

As used herein, the term "paintball" is meant to describe the commonly known combination of a liquid fill composition encased within a capsular shell structure and which is adapted for projectile motion. Although the term "ball" conventionally implies a spherical shape, the term as applied to the encapsulated fill composition described herein is not intended to be limiting to a spherical shape within the context of this invention.

The term "paintball gun" and "paintball marker" are meant to synonymously refer to the devices typically associated with the firing of paintballs.

The term "target is meant to refer to the solid or semi-solid object upon which the application of the fill composition is intended. Such objects can be living, such as human or other animals or non-living, such as inanimate or moving surfaces and structures. The terms "solid" and "semi-solid" when used in reference to a target surface are meant to describe the physical property of a surface which provides an opposing force sufficient to resist penetration by the impact-rupturable capsule when propelled onto the surface.

The term "liquid" when used to describe the fill composition of the invention, is meant to include any non-solid physical state of the composition capable of dispersing or spreading onto a given surface, i.e., in both its highly flowable state as well as semi-solid viscous and "smearable" state.

The fill composition of the invention is a soy mixture containing a dye. More specifically, the liquid fill composition of the invention is a mixture comprising a water-soluble dye, soy oil, glycerin, and a soy microcrystalline wax (available from Cargill). Additional ingredients which can be used include, but are not limited to, additional thickeners, opacifiers, and density agents.

Aqueous or water-soluble dyes which can be used in the invention include, but are not limited to, FD&C Yellow #5 (available from B F Goodrich Hilton Davis Chemical Company, Brecksville, Ohio), FD&C Yellow #6 (available from B F Goodrich Hilton Davis Chemical Company) D&C Yellow #10 (available from Warner Jenkinson, St. Louis, Mo.), FD&C Blue #1 (available from B F Goodrich Hilton Davis Chemical Company), D&C Red #28 (available from Warner Jenkinson), D&C Red #33 (available from Warner Jenkinson), Magenta Dispersion (available from Warner Jenkinson), Green Dispersion (available from Colorcon, West Point, Pa.), and Yellow Dispersion (available from Colorcon).

The aqueous water-soluble dye can be present in an amount sufficient to afford the composition with apparent coloration. The dye can be present in an amount ranging from less than 1% to about 10% by weight of the total composition. Preferably, the dye is present in an amount of about 2% by weight of the total composition.

A variety of colors can be used as the dye ingredient of the inventive composition. The liquid fill composition can be colored red, magenta, pink, yellow, blue, orange, purple, violet, green, and the like. Typically, highly visible colors are used, including fluorescent versions of the colors.

Oils used in accordance with the invention can include vegetable oils. Suitable vegetable oils include, but are not limited to, soybean oil, sunflower oil, corn oil, safflower oil, and the like. In a preferred embodiment, soybean oil is used.

The oil can be present in an amount ranging from about 20% to about 95% by weight of the total composition. Preferably, the oil is present in an amount of about 75%-95% by weight of the total composition.

Glycerin may be present in an amount ranging from about 4% to about 20% by weight of the total composition. Preferably, glycerin is present in an amount of less than 15% weight of the total composition.

Thickeners can be added to the composition to modify the texture and viscosity of the composition, and at least one thickener is preferred in the composition. Suitable thickeners include, but are not limited to, wax thickeners and silica thickeners. Suitable wax thickeners include beeswax, paraffin wax (available from Strahl & Pitsch, Inc., West Babylon, N.Y.), and soy microcrystalline wax (available from Cargill, Minneapolis, Minn.). Wax thickeners can be present in an amount up to 10% by weight of the total composition, more typically up to about 5% by weight. Preferably, the wax thickener is present in an amount of about 3.5%-4.5% by weight of the total composition.

Suitable silica thickeners include, but are not limited to, $SiO_2$ compositions. Suitable $SiO_2$ compositions include Cabosil™ (commercially available from Cabot Corporation, Edison, N.J.) and HDKN-20 (commercially available from Wacher, King of Prussia, Pa.). Silica thickeners can be present in an amount of up to 3% by weight of the total composition, typically from about 0.25% to about 2.0% by weight of the total composition. Preferably, the silica thickener is present in an amount of less than 1.0% by weight of the total composition.

In a preferred embodiment, soy microcrystalline wax is used as a thickener in the composition. Generally, the relative amounts and proportions of the thickeners will vary according to the viscosity properties desired. Preferably, the soy microcrystalline wax is present in an amount of about 2%-6% by weight of the total composition.

To increase the density of the inventive composition to a level suitable for use in a firing device, density agents can be added. One example of a density agent is calcium carbonate. Other density agents which can be used include, but are not limited to, tricalcium phosphate, dicalcium phosphate, zinc gluconate, zinc sulfate, zinc oxide, and zinc citrate. Mixtures of density agents can be used as well.

The density agent can be present in an amount sufficient to assist in the rupture of the filled capsule upon impact with a target surface. Typically, the density agent can be present in an amount up to about 50% by weight of the total composition, more typically in an amount ranging from about 1% by weight to about 35% by weight of the total composition. Preferably, the density agent is present in an amount of about 25% by weight of the total composition.

Additional ingredients can be used in accordance with the invention, provided the inventive attributes of the composition are maintained. Secondary ingredients, such as opacifiers and the like, can be added to the composition.

As shown in FIG. 1, the fill composition of the invention can be prepared by the following general process. An initial mixture can be prepared by adding the desired amount of thickener, such as soy microcrystalline wax, to a vegetable oil, such as soybean oil or soy oil. This initial mixture is created by adding 700 kgs of soy oil at step 100 to a mixing container, such as a 1500 L compounding tank. The mixing container should be heated at step 200 to a temperature range between 50° C. to 60° C. Preferably, the temperature should reach 57.2° C. by using a jacket. Once the temperature of the mixing container reaches the desired temperature, soy microcrystalline wax, or soy wax, is added at step 300 and mixed with mixing paddles located within the mixing container. The contents are mixed preferably for ten minutes at high speed. Approximately 180 kg of glycerin are added at step 400 and mixed within the mixing container. The resulting mixture containing the oil, glycerin and wax is then mixed on high speed for preferably ten minutes. While continually stirring at low speed, the mixing container is cooled at step 500. This can be accomplished by removing the heat to the mixing container and allowing cool water to surround the exterior of the mixing container. Preferably, the mixing container is surrounded by a jacket which is adapted to contain water for cooling. The cooling process should continue until the contents of the container reach the preferred temperature of 35° C. In a separate container, a desired amount of soy oil is combined at step 600 with the preferred dye components. This desired amount may be 5 kg or 10 kg of soy oil. In a preferred embodiment, the dye components consist of 2.1 kg of fluorescent orange dye and 0.75 kg of orange J-color. In another embodiment, the dye components consist of 27.6 kg of fluorescent orange dye and 2.4 kg of titanium oxide. This composition is pre-mixed thoroughly to ensure color consistency. The dye composition is then added at step 700 and mixed with the contents of the mixing container. An additional desired amount of oil, between 238 kg and 261 kg, is then added at step 800 and mixed with the contents of the mixing container. The temperature is allowed to reduce at step 900 while continually mixing the contents. The mixture temperature should be reduced to approximately 27° C. The resulting composition should be removed at step 1000 from the mixing container and stored to be used for the fill of a paintball.

Using the above process, the following batch of liquid dye composition was prepared by adding the following ingredients and respective amounts as set forth below:

| Formula 1: Dye Composition for Fill | | |
|---|---|---|
| Component | Weight (kg) | Weight % |
| Soy Oil | 948.0 | 79% |
| Soy Wax | 42.0 | 3.5% |
| Glycerin | 180.0 | 15% |
| Titanium Oxide | 2.4 | 0.2% |
| Fluorescent Orange | 27.6 | 2.3% |

Using the above process, an alternative batch of liquid dye composition was prepared by adding the following ingredients and respective amounts as set forth below:

Formula 2: Dye Composition for Fill

| Component | Weight (kg) | Weight % |
| --- | --- | --- |
| Soy Oil | 966.0 | 80.5% |
| Soy Wax | 52.0 | 4.3333% |
| Glycerin | 180.0 | 15% |
| Orange J-Color | 0.75 | 0.0625% |
| Fluorescent Orange | 2.1 | 0.175% |

Figure 2:
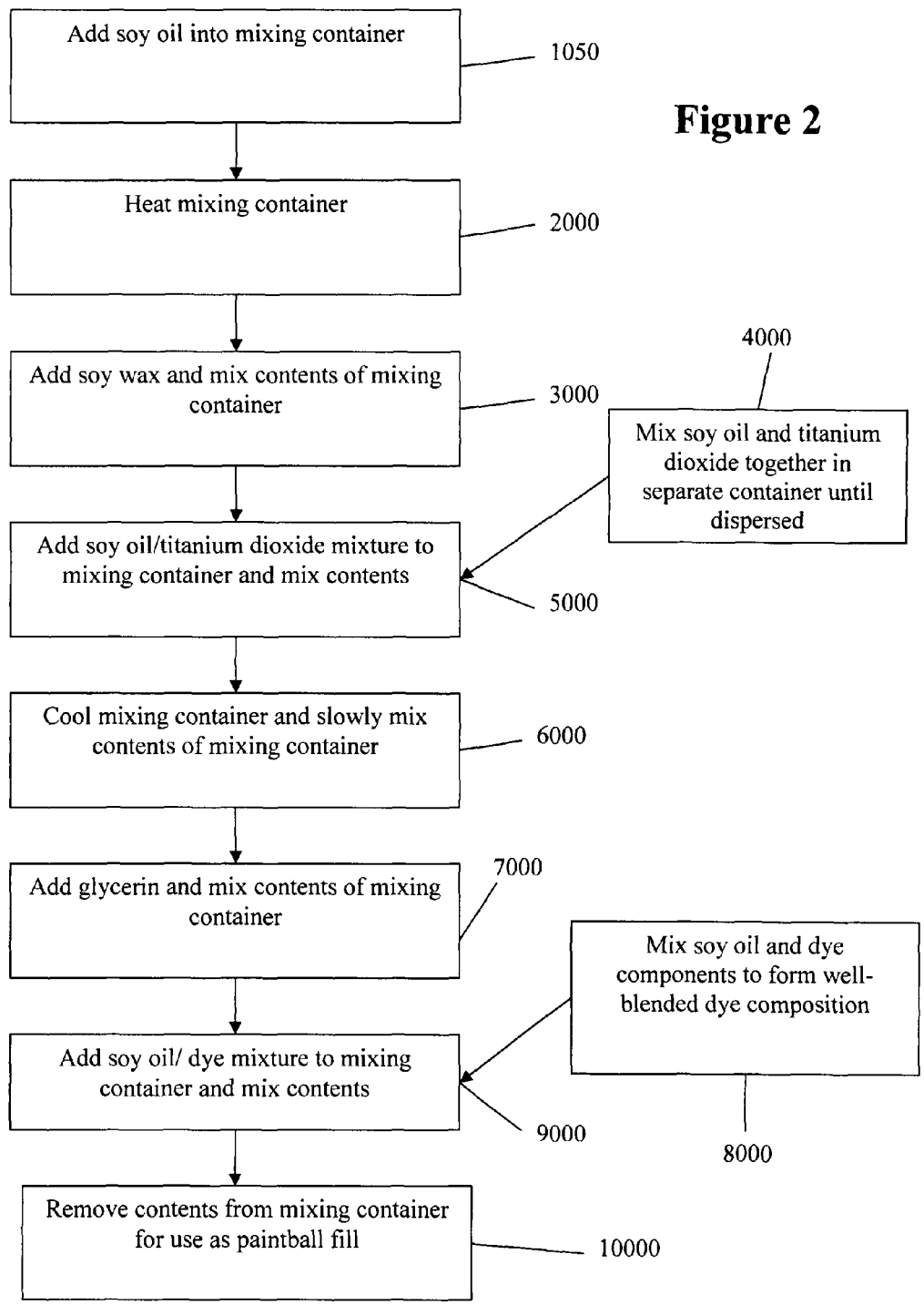
FIG. 2 is a flow chart illustrating an alternative method of manufacture of the fill of the improved paintball.

As shown in FIG. 2, an alternative fill composition of the invention can be prepared by the following general process. An initial mixture can be prepared by adding the desired amount of thickener, such as soy microcrystalline wax, to a vegetable oil, such as soybean oil or soy oil. This initial mixture is created by adding 850-1070 kgs of soy oil at step 1050 to a mixing container, such as a 1500 L compounding tank. The mixing container should be heated at step 2000 to a temperature range between 50° C. to 65° C. Preferably, the temperature should reach 60° C. by using a jacket. Once the temperature of the mixing container reaches the desired temperature, soy microcrystalline wax, or soy wax, is added at step 3000 and mixed with mixing paddles churning in opposite directions within the mixing container. The contents are mixed preferably for at least thirty minutes at high speed. Soy oil ranging between 5-150 kgs is mixed with 2 kgs of titanium oxide at step 4000 separately until dispersed. The titanium oxide and soy oil mixture is then added 5000 to the mixing container and mixed for approximately 5 minutes. While continually stirring, the mixing container is cooled at step 6000. This can be accomplished by removing the heat to the mixing container and allowing cool water to surround the exterior of the mixing container. Preferably, the mixing container is surrounded by a jacket which is adapted to contain water for cooling. The cooling process should continue until the contents of the container reach the preferred temperature of 30° C. Once cooled, 51 kg of glycerin are added at step 7000 and mixed within the mixing container. In a separate container, a desired amount of soy oil is combined at step 8000 with the preferred dye components. This desired amount may be between 5-10 kg of soy oil. In a preferred embodiment, the dye component consists of 0.5 kg of oil yellow Gr. In another embodiment, the dye component consists of 60 kg of DS series orange. In another embodiment, the dye component consists of 30 kg of DS series orange. This composition is pre-mixed thoroughly to ensure color consistency. The dye composition is then added at step 9000 and mixed with the contents of the mixing container. The resulting composition should be removed at step 10000 from the mixing container and stored to be used for the fill of a paintball.

Using the above process, the following batch of liquid dye composition was prepared by adding the following ingredients and respective amounts as set forth below:

Formula 3: Dye Composition for Fill

| Component | Weight (kg) | Weight % |
| --- | --- | --- |
| Soy Oil | 1073.0 | 93.26 |
| Soy Wax | 24.0 | 2.09% |
| Glycerin | 51.0 | 4.43% |
| Titanium Oxide | 2.0 | 0.17% |
| Dye | 0.5 | 0.04% |

Using the above process, alternative batches of liquid dye composition were prepared by adding the following ingredients and respective amounts as set forth below in the following formulas:

Formula 4: Dye Composition for Fill

| Component | Weight (kg) | Weight % |
| --- | --- | --- |
| Soy Oil | 1007.0 | 87.6% |
| Soy Wax | 30.0 | 2.6% |
| Glycerin | 51.0 | 4.4% |
| Titanium Oxide | 2.0 | 0.2% |
| Dye | 60 | 5.2% |

Formula 5: Dye Composition for Fill

| Component | Weight (kg) | Weight % |
| --- | --- | --- |
| Soy Oil | 1037.0 | 90.2% |
| Soy Wax | 30.0 | 2.6% |
| Glycerin | 51.0 | 4.4% |
| Titanium Oxide | 2 | 0.2% |
| Dye | 30 | 2.6% |

The casing material used in the impact-rupturable capsule of the invention can be any conventional material which can be formed into a capsule and adapted to encapsulate liquid contents while permitting rupture of the casing upon exertion of physical force thereon. Preferably, the casing material has chemical properties compatible with the composition contained thereby and physical properties sufficient to resist exertion of a projectile force while insufficient to resist impact forces following high airborne velocities. Even more preferred are casing materials which can be formed into an elastic ribbons or sheets to be filled with liquid and are suitable for heat or solvent sealing consistent with conventional die roll encapsulation manufacturing techniques. Additional suitable casing materials include, but are not limited to, gelatin, PVC, celluloses, modified starches, carrageenans, gums, pectins, alginates, and the like. Those skilled in the encapsulation arts will readily be able to select the appropriate casing material based upon the composition of the fill and the equipment used to perform the encapsulation. Generally, the casing material used for the capsule is any material usually used for the shell of soft capsules. An example of a useful casing material is one consisting primarily if gelatin and further containing a plasticizer, pigment, solubility adjusting agent, and the like.

The shell composition of the invention is a gelatin mixture containing glycerin. More specifically, the shell composition of the invention is a mixture comprising water, gelatin compositions, and glycerin. Additional ingredients which can be used include, but are not limited to, water-soluble dyes.

Water is utilized in an amount ranging from about 40% to about 50% by weight of the total composition. Preferably, water is utilized in an amount of about 42% by weight of the total composition.

Gelatin compositions may be present in an amount ranging from about 40% to about 50% by weight of the total composition. Preferably, gelatin compositions are present in an amount of about 48% weight of the total composition. Suitable gelatin compositions include, but are not limited to, gelatin 200 Bloom porkskin compositions.

Glycerin may be present in an amount ranging from about 5% to about 15% by weight of the total composition. Preferably, glycerin is present in an amount of about 9% weight of the total composition.

Additional ingredients can be used in accordance with the invention, provided the inventive attributes of the composition are maintained. Secondary ingredients, such as water-soluble dyes and the like, can be added to the composition.

Figure 3:
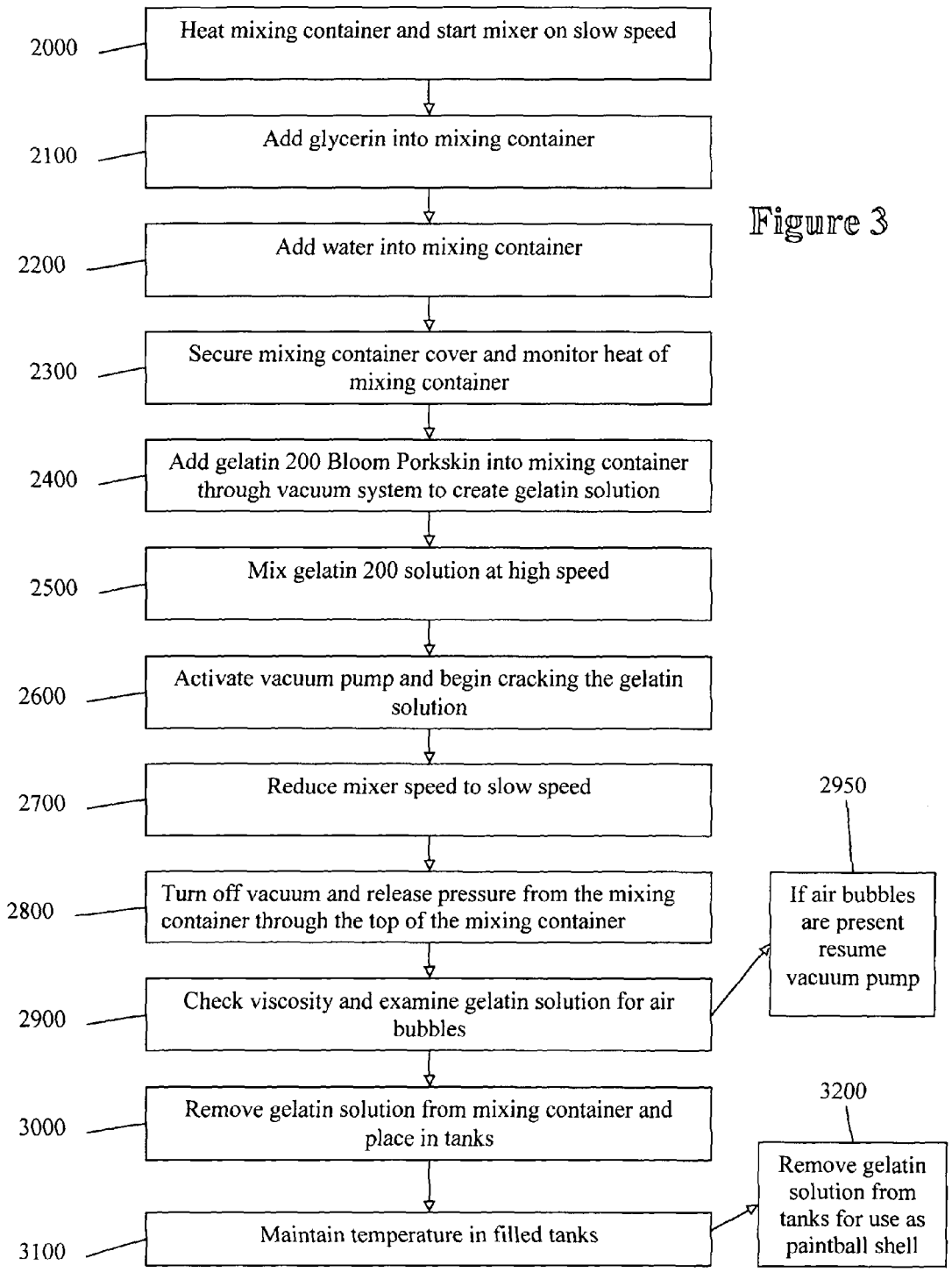
FIG. 3 is a flow chart illustrating a method of manufacture of the shell of the improved paintball.

As shown in FIG. 3, the shell composition of the invention can be prepared by the following general process. A mixing container should be heated at step 2000 initially and the mixer should be started at a slow speed. An initial mixture can be prepared by adding at step 2100 glycerin and water at step 2200 into the mixing container. The cover of the mixing container should be secured at step 2300 to maintain pressure within the mixing container. The temperature of the container should then be monitored until it reaches the desired temperature. Preferably, the mixture temperature should reach a minimum of 88° C. Once the temperature of the mixing container reaches the desired temperature, a gelatin composition is added at step 2400 into the mixing container through a vacuum system leading into the mixing container. This gelatin solution is then mixed at step 2500 at high speed for approximately twenty minutes. Temperature should be monitored throughout mixing. Preferably, the temperature should not drop below 80° C. After mixing is complete, the cover and any release valves should be checked to ensure they are secure. A vacuum pump is then activated at step 2600 to aid in cracking the gelatin solution. A SIHI vacuum pump is contemplated as a suitable vacuum pump for this step. The pressure in the mixing container will increase forcing the gelatin solution to rise within the mixing container. A release valve may be opened as needed to release pressure within the mixing container. This rising is called cracking the melt. Once the melt is cracked, or the gelatin solution is stabilized, it will no longer rise when the release valve is closed. After the gelatin solution has stabilized, the mixer speed should be reduced at step 2700 to slow speed. The vacuum process should continue for approximately seven more minutes. Preferably, the viscosity of the gelatin solution should not exceed 13,200 cP. The vacuum is then turned off at step 2800 and the pressure is released from the mixing container through the top of the mixing container. A sample of the gelatin solution should be checked 2900 for the presence of air bubbles and the viscosity of the solution. The preferred viscosity range is between 12,800 and 13,200 cP. If air bubbles are present, the gelatin solution should be further pressurized at step 2950 using the vacuum pump in small time increments. Once the bubbles are absent, the gelatin solution should be removed at step 3000 from the mixing container and placed in holding tanks. Once full, these tanks should maintained at step 3100 at a temperature of approximately 60° C. The resulting solution may be removed at step 3200 from the tanks to be used for the shell of a paintball.

Using the above process for the shell composition, the following batch of shell composition was prepared by adding the following ingredients and respective amounts as set forth below:

| Formula 6: Dye Composition for Shell | | |
|---|---|---|
| Component | Weight (kg) | Weight % |
| Glycerin | 59.0 | 9.388% |
| Water | 267.0 | 42.488% |

| -continued | | |
|---|---|---|
| Formula 6: Dye Composition for Shell | | |
| Component | Weight (kg) | Weight % |
| Gelatin NF 200 Bloom Pigskin | 302.4 | 48.12% |

The overall shape of the capsule and casing can vary. Preferably, the shape of the capsule permits substantially linear movement through air when fired by a paintball gun. Most preferably, the shape of the capsule is spherical. The diameter of the capsule can vary but is preferably compatible with the firing device with which it is to be used. For example, a 0.68 caliber spherical capsule can be used with commercially available paintball guns.

The exterior appearance of the casing material and capsule can vary as well. A variety of visual designs and exterior coloration alternatives are possible. As with the fill formulation, a wide variety of colors can be used for the casing material either integrally or on the exterior surface alone. Lines, stripes, spots, marbled, two-tone designs can be used, for example. Various patterns can be applied to the surface of the capsules using the technique described in Brox et al., U.S. Pat. No. 5,529,767, the entire text of which is incorporated herein by reference.

The impact-rupturable capsules of the invention can be prepared using conventional techniques and apparatuses. Generally, with some modifications, the apparatuses used to prepare soft gelatin capsules in the pharmaceutical field can be used to manufacture impact-rupturable capsules. One example of a suitable apparatus is described in Stroud et al. U.S. Pat. No. 5,735,105, the entire text of which is incorporated herein by reference. This patent describes an apparatus and method for preparing liquid-filled capsules using a die roll apparatus through which a casing material in the form of a ribbon or sheet is fed.

The impact-rupturable capsules containing the fill composition of the invention are set into projectile motion with the casing substantially intact at a velocity sufficient to create the force permitting rupture of the casing and release of the liquid dye composition therein upon physical impact with the target surface. Typically, the suitable velocity range is from about 200 ft/sec to about 400 ft/sec, preferably within a range from about 300 ft/sec to about 350 ft/sec. Such devices are typically in the form of a gun assembly adapted for use with the capsules. The gun assembly is commonly referred to as a paintball gun or "marker." Suitable paintball guns include commercially available models such as those from Brass Eagle (Bentonville, Ark.). Accordingly in use, the impact-rupturable capsule is removed from a container and loaded into the paintball gun. The gun is aimed at the intended target and fired, ejecting the impact-rupturable capsule substantially intact at high speed toward the target through the use of pressurized $CO_2$ or $N_2$. Upon impact on the target surface, the casing ruptures thereby releasing the liquid contents within onto the surface. The appearance of the liquid contents on the surface material is readily apparent by the observer.

The fill composition of the invention is useful in capsular structures designed for projectile motion and rupture upon impact with a target surface. Such uses include those associated with paintball gaming activities, as well as other contexts of marking of objects. Typically, the impact-rupturable capsules of the invention are set into motion by a firing device, such as a paintball gun.

The invention has been described with reference to various specific and preferred embodiments and techniques. It will be understood, however, that reasonable modifications of such embodiments and techniques can be made while remaining within the spirit and scope of the invention.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. A liquid dye composition adapted for use in an impact-rupturable capsule comprising a water-soluble dye, a lipophilic carrier, and a thickener consisting essentially of a soy microcrystalline wax thickener, said lipophilic carrier having an oil.

2. The liquid dye composition according to claim 1 wherein the oil is vegetable oil.

3. The liquid dye composition according to claim 2 wherein the oil is soybean oil.

4. The liquid dye composition according to claim 1 wherein the oil is present in an amount ranging from about 75% to about 95% by weight of the total composition.

5. The liquid dye composition according to claim 1 wherein the thickener is present in an amount ranging from about 2% to about 6% by weight of the total composition.

6. The liquid dye composition according to claim 1 further comprising glycerin.

7. The liquid dye composition according to claim 6 wherein glycerin is present in an amount ranging from about 4% to about 15% by weight of the total composition.

8. A liquid dye composition adapted for use in an impact-rupturable capsule comprising glycerin, a water-soluble dye, a thickener, and a vegetable oil carrier, said thickener selected from the group consisting essentially of a soy microcrystalline wax.

9. The liquid dye composition according to claim 8 wherein glycerin is present in an amount ranging from about 4% to about 15% by weight of the total composition.

10. The liquid dye composition according to claim 8 wherein the oil is soybean oil.

11. The liquid dye composition according to claim 8 wherein the oil is present in an amount ranging from about 75% to about 95% by weight of the total composition.

12. The liquid dye composition according to claim 8 wherein the thickener is present in an amount ranging from about 2% to about 6% by weight of the total composition.

13. An impact-rupturable capsule comprising:
   a casing containing a liquid dye composition, to remain intact upon exertion of projectile forces sufficient to propel said casing, and to rupture upon impact with a solid or semi-solid surface and release said liquid composition; and
   wherein said liquid dye composition comprises a water-soluble dye, a lipophilic carrier, and a thickener consisting essentially of a soy microcrystalline wax thickener, said lipophilic carrier having an oil.

14. The liquid dye composition according to claim 13 wherein the thickener is present in an amount ranging from about 2% to about 6% by weight of the total composition.

15. The liquid dye composition according to claim 13 wherein the oil is soybean oil.

16. The liquid dye composition according to claim 15 wherein the oil is present in an amount ranging from about 75% to about 95% by weight of the total composition.

17. The liquid dye composition according to claim 13 further comprising glycerin present in an amount ranging from about 4% to about 15% by weight of the total composition.

18. The impact-rupturable capsule according to claim 13, the casing comprising gelatin and glycerin.

19. The casing according to claim 18 further comprising a water-soluble dye.

20. The casing according to claim 18 wherein glycerin is present in an amount ranging from about 5% to about 15% by weight of the total composition.

* * * * *